United States Patent Office 2,747,691
Patented May 29, 1956

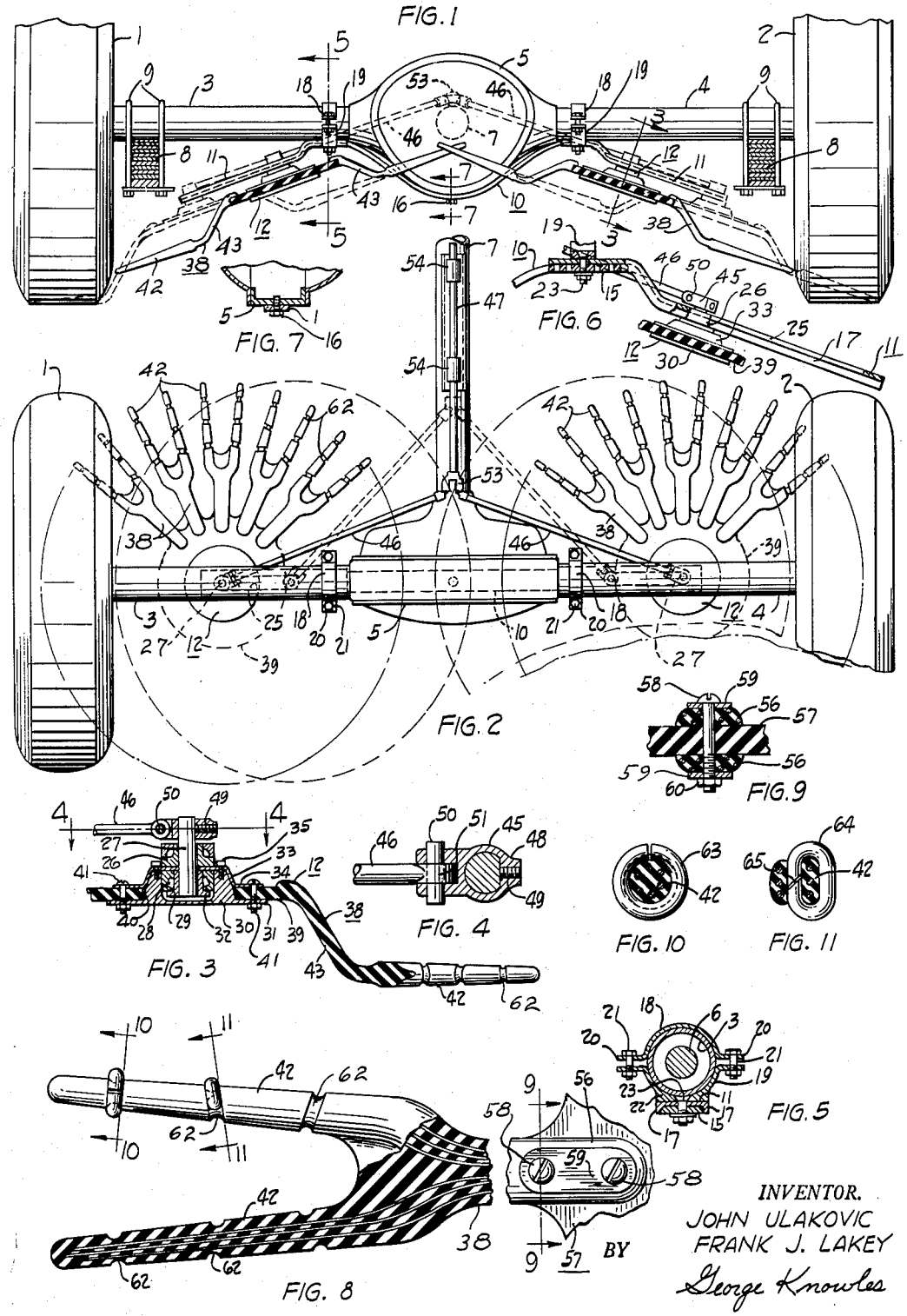

2,747,691
RETRACTABLE TRACTION AND ANTISKID DEVICE FOR VEHICLES

Frank J. Lakey, Cleveland, Ohio, and John Ulakovic, McKeesport, Pa.

Application November 5, 1952, Serial No. 318,902
16 Claims. (Cl. 188—4)

This invention relates to traction-increasing or skid-preventing devices for use with automotive vehicles. It is particularly concerned with traction or antiskid devices of the type comprising elongated elements mounted on rotatable heads to pass under the vehicle wheels and thereby prevent or minimize slipping and skidding of the wheels on the supporting ground or road surface being traversed by the vehicle.

Traction-increasing devices and devices for preventing or minimizing skidding of automobiles and other vehicles have been developed along various lines. Some are incorporated directly and permanently in the wheel or tire structures and are in use continuously regardless of the condition of the road or ground over which the vehicle travels. Devices of this type are convenient and are always in operation in a time of emergency. They do, however, have certain disadvantages, in that they usually embody metal parts, heavy lugs, or cleats of rubber molded, formed or embedded in or on the road-engaging periphery of a wheel or tire. Such devices are noisy and they vibrate or shake the vehicle when traveling over smooth, paved highways. They tend to reduce the speed and efficiency of an automobile or other vehicle and wear away rapidly so that their effectiveness diminishes progressively.

Another type of antiskid and traction-increasing device is removably mounted on the vehicle wheel tire, metal chains and rubber bands or cleats being common examples of this type. While these demountable devices are satisfactory in use and have the advantage of being removable to prevent wear when they are not needed, they are difficult to install and remove, frequently requiring the jacking of the vehicle and the assistance of an experienced serviceman.

Still another type of traction or antiskid device that has been proposed is one which is mounted permanently on the vehicle and includes traction-increasing elements that are movable at the will of the vehicle operator either into or out of engagement with the road or other surface on which the vehicle is supported. One arrangement of this type of device that has been used embodies traction elements that are driven and engage the road or ground directly to provide the desired grip and traction. Another arrangement, and it is to this latter type of device that the present invention is directed, embodies traction elements that are moved into engagement with a driving wheel of the vehicle and are moved by such wheel to pass between the wheel and the ground or road surface. The traction elements are thus subjected to the weight of the vehicle and strongly resist sliding and slipping of the vehicle relative to the road or supporting ground.

The device of the present invention preferably employs a rotary head for carrying the traction elements, the elements themselves being formed of resilient shape retaining material, it being one of the principal objects of the invention to provide complete assemblies of traction elements having shape retaining characteristics adapted to be mounted on the vehicle as rotary units. In a modified arrangement the rotary unit incorporates a multiplicity of separable and preferably deformable shape retaining traction elements that can be individually removed and replaced in service without replacing all of the traction elements of the rotary unit, desirably without even removing the rotary unit from its mounting on the vehicle.

Rotary head traction devices heretofore available have generally been designed as individual units, the unit for one of the rear wheels of a vehicle being mounted separately and independently of the unit for the other of the rear wheels of the vehicle. In the structure of the present invention a pair of rotary heads are mounted on the opposite ends of a common carrier or frame. As a feature of construction and another objective of the invention, this carrier frame is adapted to be quickly and easily mounted on the rear or drive axle housing of conventional automobiles and trucks. In thus utilizing a common frame for mounting the two rotary heads of a traction augmenting system in spaced relation to one another the frame structure is simplified and lightened in weight, thus reducing cost and making the entire antiskid system or installation less cumbersome and less subject to mechanical and structural faults.

As a further refinement pertaining to the last-mentioned aspect of the invention the carrier or frame is adjustable to accommodate the particular dimensional characteristics of different makes of automobiles. In this manner economy is realized, in that a single size or model is utilized on numerous makes of automobiles, thereby reducing not only the cost of production but also the inventory carried by dealers and service stations.

Another object of the invention is to provide an improved mounting arrangement for supporting the rotary head of the traction device on the frame or carrier. This aspect of the invention is directed to a track and slide combination which permits translatory movement of the rotary head over a predetermined path into and out of operative relation to the vehicle wheel. As a particularly advantageous arrangement of a track and slide type mount for a rotary traction head in combination with a mounting carrier or frame the latter is constructed with a cantilever portion on which the track is formed or mounted and the rotary head is made slidable on the cantilever portion of the carrier frame toward and away from the free end of the cantilever portion.

Other objects and advantages of the invention pertain to certain novel features of construction and combinations and arrangements of parts which obtain simplicity and economy in production, installation and service and greater safety in use. These objects are apparent in the following detailed description of suitable embodiments of the invention, this description being made in connection with the accompanying drawings forming a part of the specification.

In the drawings:

Figure 1 is an elevational view, partly diagrammatic and partly in section and with parts broken away and removed, of the rear axle, transmission and drive wheels of a motor vehicle, showing the antiskid device of the present invention suspended from the axle;

Fig. 2 is a top plan view, partly diagrammatic and with parts broken away and removed, showing the drive axle, wheels and antiskid device of Fig. 1;

Fig. 3 is a fragmentary sectional detail through the rotary head of the antiskid device, this view being taken substantially along the line indicated at 3—3 of Fig. 1;

Fig. 4 is a fragmentary sectional detail taken substantially along the lines indicated at 4—4 of Fig. 3;

Fig. 5 is a sectional detail taken transversely through the drive axle on the vehicle to illustrate the construction of the carrier frame of the antiskid device and the manner in which the frame is attached to the drive axle;

Fig. 6 is a sectional detail taken substantially along the lines 6—6 of Fig. 5;

Fig. 7 is a fragmentary sectional detail showing the attachment of the carrier frame and the differential housing of drive axle, this view being taken substantially along the line 7—7 of Fig. 1;

Fig. 8 is a foreshortened plan view, partly in section and with parts broken away and removed, showing a modified form of traction element, this element being individually removable and replaceable on the rotary head;

Fig. 9 is a sectional detail taken substantially along the line 9—9 of Fig. 8; and Figs. 10 and 11 are sectional details taken substantially along the lines 10—10 and 11—11, respectively, of Fig. 8 to show suitable metal attachments for mounting on the traction elements to improve the road-gripping properties of the latter.

The rear drive axle, wheels and related parts shown in the drawings represent conventional structures employed in automobiles and trucks. Wheels 1 and 2 are mounted on the ends of tubular housings 3 and 4 which are secured at their inner ends to a relatively large or bulbous differential housing 5. Extending axially through the tubular housings 3 and 4 are rotary shafts, one of which is shown at 6 (Fig. 5). The outer ends of these shafts are drivingly connected to the wheels 1 and 2. The inner ends of the drive shafts are connected to conventional differential gearing within the enlarged housing 5 so as to be driven from the engine and transmission of the vehicle in the usual manner by a main drive shaft in a longitudinally extending tubular housing 7 secured to and extending forwardly from the housing 5. The frame of the vehicle (not shown) is suspended on the axle housings 3 and 4 by semielliptical spring assemblies 8 attached to the housing as by U-bolts 9. In Fig. 2 the suspension springs and other parts are omitted for clarity and items such as brakes and shock absorbers are omitted from all the figures.

Secured to and extending along the underside of the rear drive axle assembly of the vehicle is the carrier frame of the antiskid device, this frame comprising a central spanner or yoke portion 10 and cantilever end portions 11 comprising tracks on which rotary heads 12 are mounted.

The spanner or yoke portion 10 of the carrier frame is formed of a metal bar such as steel or aluminum of rectangular section and has a central U-shaped portion which in general parallels or follows the contour of the bottom of the differential housing 5. The ends of the carrier frame yoke portion are bent or formed outwardly in the provision of integral horizontally disposed portions 15 that underlie the tubular housings 3 and 4. At its mid point the yoke portion 10 is secured to the bottom of the differential housing 5 as by cap screw 16 (Fig. 7).

Each of the frame end members 11 is channel-shaped in cross-section (Fig. 5) and receives one of the horizontal ends of the yoke member interfittingly, the end members having edge flanges 17 which embrace the side edges of the yoke ends 15 in the provision of longitudinally slidable interlocks. The frame ends, like the yoke, are of metal such as steel or aluminum and together with the yoke ends are secured to the tubular housings 3 and 4 by encircling clamps each comprising separable sections 18 and 19. These clamp sections have laterally projecting ears 20 apertured to receive bolts 21 by means of which the clamp halves are drawn tightly about the housings. The lower clamp sections 19 have flat bottomed bosses 22 attached to the semicircular clamp half as by welding or formed integrally thereon. Recessed head bolts 23 extend downwardly through the bosses 22 and through aligned openings in the channel-shaped track members 11 and in the ends 15 of the yoke portion of the frame. A nut threaded on the lower end of each of the bolts 23 draws the frame parts 11 and 15 together and holds the upper face of the channel-shaped end member 11 against the underside of the clamp boss 22. In the drawing together of the parts by the fastening bolts 23 the ends 15 of the central frame member or yoke 10 are received snugly between the flanges 17 of the channel-shaped end members and against the main or web portions of the frame end members to provide the desired interlock of the parts which resists twisting and turning of the frame ends on the fastening bolts 23.

Either the channel end members 11 or the end portions 15 of the yoke or both the channel members and the yoke ends are formed with a plurality of openings spaced along their length to receive the fastening bolts 23 in different relative positions in adjusting the frame to different vehicles or optionally to receive a plurality of the bolts so that a plurality of the housing encircling clamps can be utilized to secure each end of the yoke and each of the frame ends to one of the tubular housings of the vehicle axle.

Outwardly of the clamps 18—19 that encircle the axle housings 3 and 4 the end members 11 are formed with track portions that are offset downwardly from the axle and slope downwardly and outwardly toward the lower portions of the vehicle wheels, each of the track portions of the frame ends 11 being obliquely disposed at an acute angle to the axis of the vehicle axle.

Each track portion of the supporting frame of the device is formed with a longitudinally extending slot 25 which receives a slide 26 that is thus supported and guided for longitudinal movement along the track portion of the frame. The slides 26 are each approximately inverted T-shaped sections (Fig. 3) having flat bearing surfaces engageable not only with the walls of the slot 25 but with the bottom edges of the end member flanges 17 to locate the slide in and relative to the track and to resist both lateral and upward thrust of the slide against the track and turning of the slide. A spindle 27 received through a central bore in the slide 26 has end portions projecting both above and below the slide. The rotary head 12 is mounted on the lower end of the shaft 27 and held against axial shifting thereon as by a suitable roller bearing assembly 28. An inner race or element 29 of the bearing assembly is secured on the bottom of the shaft 27 and supports the rotary head.

Each of the rotary heads of the traction-augmenting device comprises a circular hub 30 formed with an integral radially projecting flange 31. The hub has a central axial recess 32 which receives the lower end of the shaft 27 and the bearing assembly 28. A hat section circular cover 33 is received over the top of the hub 30, being contoured to fit the latter and having an integral radially projecting circular flange 34 disposed in spaced generally parallel relation to the hub flange 31. The cover 33 comprises a metal stamping and is centrally apertured to receive the shaft 27. Cap screws 35 extend through the cover, being threaded into tapped holes in the upper face of the hub 30 to secure the cover to the latter.

An assembly of resilient shape retaining antiskid elements 38 and a resilient deformable supporting body 39 is carried by the hub 30, the resilient body 39 being formed with a central aperture 40 which receives the hub 30. A plurality of through fasteners or bolts 41 are received through aligned openings in the flanges 31 and 34 and the central body 39 of the deformable assembly, the body 39 being thus clamped between the metal flanges 31 and 34 of the rotary head.

The deformable elements 38 are spaced about the periphery of the deformable body or disc 39, extending radially outwardly from the latter, as indicated at Fig. 2. These elements each includes an outwardly projecting portion disposed at an angle to the plane of the body disc 39 and an end portion which generally parallels the plane of the body disc 39, being offset downwardly from the latter, the end portion desirably taking the form of a pair of integral fingers 42 that diverge slightly from one another. Each of the elements 38 is thus bifurcated in character as shown in Fig. 2 and the individual fingers are all disposed in a common surface generated by the fingers upon rotation of the head about the shaft 27.

The fingers 42, by reason of the offset provided by the oblique portions 43 of the radial elements, are thus spaced downwardly from the plane of the body disc 39 and are all at a generally lower level. This downward offsetting of the fingerlike ends of the deformable skid-resisting elements is of advantage, in that such elements are disposed relatively close to the ground or road surface while permitting the metal parts of the device, such as the hub 30 and the shaft 27, to be at a higher elevation. Thus an object such as a stone, curb or rock over which the vehicle passes may strike or engage the deformable elements 38 without injury or damage to the latter while the metal parts of the device are carried at a higher elevation which clears the rock or curb. Although omitted from Fig. 3 to avoid confusion, the resilient deformable disc 39 and the radial elements 38 include tensile reinforcing elements such as cords of cotton, linen, rayon or other synthetic fiber or of woven or twisted wire cable. Such tension elements, shown in Figs. 8-11 in connection with a modified structure, extend longitudinally through the fingers 42, the oblique portions 43 and into and through the disc body 39 to resist radial stresses imposed on the antiskid elements. The rubber or like deformable material of which the supporting body and the projecting finger elements are made is compounded so that the finger elements extend cantilever fashion and are inherently self-supporting as shown in Fig. 1, thereby projecting stiffly outwardly rather than sagging or drooping downwardly to drag on the ground or roadway.

To shift the rotary heads 12 longitudinally in the slots 25 of the track members 11, the upper ends of the shafts 27 are received in clevis fittings 45 connected by link rods 46 to a common actuating rod 47. The shafts 27 may be formed with flats 48, the clevis fittings 45 being similarly shaped to prevent relative turning. Set screws 49 are threaded through the clevis fittings and are engaged against the shafts or received within recesses in the latter to retain the fittings on the shafts. The clevis fittings ride on the top surfaces of the tracks, thereby suspending the rotary heads and preventing the shafts 27 from dropping out of the slides 26. Pins 50 are received through aligned apertures in the bifurcated ends of the clevis fittings and in eyes 51 on the ends of the link rods 46 in the provision of the usual swinging joints which permit swinging of the links 46 in the planes of the respective shafts 27.

The connections of all the link rods to the common actuator 47 include universal joints 53 which permit swinging of the link rods relative to the actuator. Tubular guides 54 are suitably mounted on the vehicle body or frame or on the drive shaft housing 7 to receive the actuator 47 and constrain the latter to endwise or longitudinal movement. The actuator extends forwardly to a suitable operating lever or mechanism (not shown) by means of which the driver of the vehicle can shift the rod 47 longitudinally in the guides 54. This endwise or longitudinal movement of the actuator 47 shifts the link rods 46 between the retracted, or broken line, position shown in Fig. 2 and the extended, or full line, position of that figure.

The limits of movement of either or both extension and retraction of the rotary heads are suitably determined as by engagement of the slides 26 with the track members 11 at the ends of the longitudinal slots 25. In the retracted position, illustrated by the full lines of Fig. 1, the slides 12 are so disposed that the outer or tip ends of the deformable figures 42 are spaced inwardly from and are clear of the vehicle wheels 1 and 2 and are above the level of the ground or road on which the vehicle travels. In its retracted position each of the rotary heads is normally inactive and substantially stationary although free to turn on the shaft 27 by which it is supported. Upon movement of the rotary heads to the extended positions shown in broken lines in Fig. 1 and in full lines in Fig. 2, this movement of the two rotary heads preferably occurring simultaneously by reason of the connection of such heads to the common actuator 47, the heads are carried downwardly and outwardly so as to move the stiff resilient cantilever-like fingers 42 against the wheels 1 and 2 and, as upon deflection by the wheels, against the ground or road surface on which the vehicle is supported. The engagement between the fingers 42 and the wheels or the ground causes the heads 12 to rotate on the shafts 27, thereby carrying succeeding pairs of the fingers 42 under the vehicle wheels, where they augment the traction. By reason of the resilient and elastic character of the individual traction augmenting elements, shifting and sliding of the peripheral road contacting portion of the wheel which frequently occurs in the case of a rubber-tired wheel does not impose objectionable stresses on the rotary head or the frame of the antiskid device and damage is avoided.

In Figs. 8 through 11 is illustrated a modification of the rotary head wherein separately formed radial antiskid elements are secured to a deformable disclike body for individual removal and replacement as desired. This feature permits repair of the antiskid device without removal of the entire rotary head in the event that some of the fingers 42 become worn or damaged. The inner end of each of the resilient rubber elements 38, instead of being integral with the supporting disc, as previously described, is bifurcated in the provision of spaced branch portions 56 between which is received the peripheral edge of a deformable circular disc 57 corresponding to the central supporting disc portion 39 of the rotary head in the preceding figures. Bolts 58 extend through the branches 56 and the disc 57 to clamp the latter between the branches, metal plates 59 being interposed between the heads of the bolts and the branches and also between nuts 60 and the rubber branches. To remove one of the deformable skid resisting elements the bolts 58 are withdrawn to free the branches 56 and permit withdrawal of the old element for replacement by another.

To augment the skid resisting effect obtained in passing the resilient fingers 42 between the vehicle wheels and the road surface the fingers may be formed with suitable characters such as a series of spaced circumferential grooves or channels 62. Further augmentation of the skid resisting property is obtained as by clamping metal rings, one of which is indicated at 63, about the fingers 42. The metal rings are desirably received in the grooves 62, thus providing an interlock which resists shifting of the rings longitudinally along the fingers. In another arrangement the fingers 42 are pierced by sharpened ends 65 of metal rings 64 which are clamped on the fingers at spaced points along the length of the latter. The sharpened ends of the rings are forced into and through the rubber of the fingers and into juxtaposition with one another. This arrangement provides a positive interlock which effectively holds each metal ring securely in place on the rubber finger.

The present invention thus provides an improved rotary head device for augmenting the traction and skid resisting properties of vehicle wheels in that the radial finger elements are individually self-supporting in their outwardly protruding attitudes so that in moving into operative positions the heads first carry the tips of the finger elements into engagement with the vehicle wheels, thereby effecting rotation of the heads before the finger elements contact the ground or are projected under the wheels. The stiffness of the finger elements insures that they are positively carried into the angle between the wheel and the roadway when the rotary heads are extended to operative positions, this operating feature being achieved even when the rotary heads are moved to intermediate positions in which only the tip ends of the finger elements are projected under the wheels. In this manner it is feasible to vary the degree of augmentation of the skid resistance.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim and desire to secure by Letters Patent of the United States is:

1. An antiskid device for use with an automotive vehicle having a driving axle encased in a tubular housing and a wheel at one end of the axle and secured thereto in driving relation, said device comprising a track member formed with an elongated slot, a slide received in the slot of the track member and supported by the latter for relative sliding movement, the slide having flat bearing surfaces engageable with the walls of the elongated slot to resist lateral thrust forces and to prevent turning of the slide in the slot, means for securing the track member to the axle housing so that movement of the slide in the slot carries the slide to or from the wheel of the vehicle, a rotatable head on the slide, and a plurality of resilient deformable elements projecting radially from the head, said elements having sufficient stiffness and rigidity to support themselves cantilever fashion for bodily movement with the slide and into contacting relation with the wheel of the vehicle and to be carried under the latter as the head rotates on the slide.

2. An antiskid device for use with an automotive vehicle having a driving axle encased in a tubular housing and a wheel at one end of the axle and secured thereto in driving relation, said device comprising a track member, means for securing the track member to the axle housing, the secured track member including a cantilever end portion, a slide supported by said cantilever end portion of the track member for relative sliding movement, the slide having flat bearing surfaces engageable with the walls of the elongated slot to resist lateral thrust forces and to prevent turning of the slide in the slot, means having connection with the slide for moving the latter on the cantilever portion of the track member in directions to and from the wheel of the vehicle, a rotatable head on the slide, and a plurality of resilient deformable elements each carried by the rotatable head in cantilever fashion, the ends of the elements being engageable with the vehicle wheel upon movement of the slide toward the latter.

3. An antiskid device for a wheeled vehicle, said device comprising a rotary head structure and a carrier therefor, said head structure including a plurality of rubber spokes arranged in radial relation, each spoke being several times greater in length than in thickness, and being tapered along its length with its greatest cross-section adjacent the rotational axis of the head structure.

4. An antiskid device for a wheeled vehicle, said device comprising a rotary head structure and a carrier therefor, said head structure including a rubber disc, a pair of metal members disposed one on either side of the disc and gripping the latter therebetween, a plurality of rubber spokes carried by the rubber disc and arranged in radial relation, each spoke being several times longer than its greatest thickness and having an inner solid portion and an outer plural fingered portion, reinforcing tension elements extending longitudinally through the spokes, said tension elements being continuous through both the inner and outer portions of the spokes, the spokes each being individually mounted on the rubber disc cantilever fashion and having sufficient stiffness to be substantially self-supporting in all attitudes of the head structure, and means for mounting the carrier on a vehicle for bodily movement to and from one of the wheels of the vehicle.

5. An antiskid device for use with an automotive vehicle having driving axles connected by a differential and encased in tubular housings secured rigidly to and extending from opposite sides of a relatively large housing encasing the differential, the vehicle also including wheels on the ends of the axles remote from the differential, said device comprising a track assembly contoured to extend along and in generally parallel relation to the surfaces of both of the tubular housings and also the large differential housing, said track assembly including longitudinally slotted slide receiving end portions, means connected to the track assembly inwardly of the slide receiving end portions for securing such assembly to the housings, slides mounted on the slide receiving end portions of the track assembly for movement toward and away from the wheels, the slides having bearing means engageable with the walls of the slots in the end portions of the track assembly to resist lateral thrust forces and to prevent turning of the slides in the slots, heads and means mounting the heads on the slides for rotation about generally upright axes, a plurality of resilient elements carried by each rotary head in radial relation, and means for sliding the heads along the track assembly to carry the resilient elements into and out of engagement with the vehicle wheels.

6. An antiskid device for use with an automotive vehicle having driving axles connected by a differential and encased in tubular housings secured rigidly to and extending from opposite sides of a relatively large housing encasing the differential, the vehicle also including wheels on the ends of the axles remote from the differential, said device comprising a track assembly contoured to extend along and in generally parallel relation to the surfaces of both of the tubular housings and also the large diffferential housing, said track assembly including longitudinally slotted slide receiving end portions inclined downwardly from the housings, means located inwardly of the downwardly inclined end portions for securing the track assembly to the housings, slides mounted on the inclined end portions of the track assembly, the slides having bearing means engageable with the walls of the slots in the end portions of the track assembly to resist lateral thrust forces and to prevent turning of the slides in the slots, heads and means mounting the heads on the slides for rotation about generally upright axes, a plurality of resilient elements carried by each rotary head in radial relation, and means for sliding the heads along the track assembly to carry the resilient elements into and out of engagement with the vehicle wheels and to raise and lower the slides, rotary heads and resilient elements.

7. An antiskid device for use with an automotive vehicle having driving axles connected by a differential and encased in tubular housings secured rigidly to and extending from opposite sides of a relatively large housing encasing the differential, the vehicle also including wheels on the ends of the axles remote from the differential, said device comprising a track assembly including a central yoke contoured to fit the outside of the differential housing, said yoke having end portions extending along the tubular housings, said track assembly also including parts removably interfitted with the end portions of the yokes and extending toward the wheels from the latter, the track parts having slide receiving end portions, means encircling the tubular housings and connected to the end portions of the yoke and the track parts at the interfitting connections to secure the track assembly to the housings, slides mounted on the slide receiving end portions of the track assembly for movement toward and away from the wheels, heads and means mounting the heads on the slides for rotation about generally upright axes, a plurality of resilient elements carried by each rotary head in radial relation, and means for sliding the heads along the track assembly to carry the resilient elements into and out of engagement with the vehicle wheels.

8. An antiskid device for use with an automotive vehicle having driving axles connected by a differential and encased in tubular housings secured rigidly to and extending from opposite sides of a relatively large housing encasing the differential, the vehicle also including wheels on the ends of the axles remote from the differential, said device comprising a track assembly including a central yoke contoured to fit the outside of the differential housing and parts extending along the tubular housings, said parts having slide receiving end portions extending toward the wheels from the yoke, means securing the track parts to the tubular housings inwardly of the slide receiving end portions, means securing a central portion of the yoke to the differential housing, slides mounted on the slide receiving end portions of the track assembly for movement toward and away from the wheels, heads and means mounting the heads on the slides for rotation about generally upright axes, a plurality of resilient elements carried by each rotary head in radial relation, and means for sliding the heads along the track assembly to carry the resilient elements into and out of engagement with the vehicle wheels.

9. An antiskid device for use with an automotive vehicle having driving axles connected by a differential and encased in tubular housings secured rigidly to and extending from opposite sides of a relatively large housing encasing the differential, the vehicle also including wheels on the ends of the axles remote from the differential, said device comprising a track assembly including a central yoke contoured to fit the outside of the differential housing, said yoke having end portions extending along the tubular housings, said track assembly also including parts removably interfitted with the end portions of the yokes and extending toward the wheels from the latter, the track parts having slide receiving end portions inclined downwardly away from the housings, means for securing the track assembly to the housings, slides carried by the slide receiving end portions of the track parts and slidable therealong to and from the wheels, heads and means mounting the heads on the slides for rotation about generally upright axes, a plurality of resilient elements carried by each rotary head in radial relation, and means for sliding the heads along the track assembly to carry the resilient elements into and out of engagement with the vehicle wheels.

10. An antiskid device for use with an automotive vehicle having a driving wheel, said device comprising a rotary head, a plurality of resilient deformable members secured to the head in radial relation, each resilient member having a base portion secured at its inner end to the rotary head and a multiple pronged end portion remote from the rotational axis of the head, and means for mounting the head on the vehicle for rotation about a generally upright axis and for bodily movement toward and away from the driving wheel, the resilient members and the prongs of the latter being sufficiently stiff and self-supporting to project outwardly from the head cantilever fashion.

11. An antiskid device for use with an automotive vehicle having a driving wheel, said device comprising a rotary head, a plurality of resilient deformable members secured to the head in radial relation, each resilient member having a solid inner end portion secured to the rotary head and a multiple pronged outer end portion of less aggregate cross sectional area than the solid end portion, and means for mounting the head on the vehicle for rotation about a generally upright axis and for bodily movement toward and away from the driving wheel, the resilient members and the prongs of the latter being sufficiently stiff and self-supporting to project outwardly from the head cantilever fashion.

12. An antiskid device for use with an automotive vehicle having a driving wheel, said device comprising a rotary head, a plurality of resilient deformable rubber spokes carried by the head and radiating from the latter, said spokes being sufficiently stiff and self-supporting to project outwardly from the head in cantilever fashion, metal elements secured to the rubber spokes adjacent the outer ends of the latter to be carried under the vehicle wheel by the spokes when the wheel rides over the spokes, and means for mounting the head on the vehicle for rotation about a generally upright axis and for bodily movement toward and away from the driving wheel.

13. A rotary head for an antiskid device for use with an automotive vehicle having a driving wheel, said head comprising a rigid hub member of generally circular form and a resilient deformable member carried by the rigid hub member, the resilient member including a generally circular deformable disc portion of larger diameter than and projecting radially beyond the rigid member and a plurality of elongated deformable elements each of several times greater length than tranverse dimension attached at one end to and radiating from the disc portion radially outwardly of the rigid member.

14. A rotary head for an antiskid device for use with an automotive vehicle having a driving wheel, said head comprising a resilient deformable member which includes a generally circular deformable disc portion and a plurality of elongated deformable elements each attached at one end to and radiating from the disc portion, a pair of hub members at least one of which is generally circular disposed on opposite sides of and clamping between them the disc portion of the resilient member, and the diameter of the circular one of the hub members being less than that of the disc portion of the resilient member and the periphery of such disc portion projecting radially beyond the other of the hub members whereby the periphery of the disc portion of the deformable member is free for lateral deflection under forces transmitted to it by the elongated elements.

15. A rotary head for an antiskid device for use with an automotive vehicle having a driving wheel, said head comprising a rigid hub member of generally circular form and a resilient deformable member carried by the rigid hub member, the resilient member including a generally circular deformable disc portion of larger diameter than and projecting radially beyond the rigid member and a plurality of elongated rubber elements each of several times greater length than transverse dimension attached at one end to and radiating outwardly from the disc portion in cantilever fashion.

16. A rotary head for an antiskid device for use with an automotive vehicle having a driving wheel, said head comprising a rigid hub member of generally circular form and a resilient deformable member carried by the rigid hub member, the resilient member including a generally circular deformable disc portion of larger diameter than and projecting radially beyond the rigid member and a plurality of elongated deformable elements each of several times greater length than transverse dimension attached at one end to and radiating from the disc portion radially outwardly of the rigid member, the elongated elements each having an outer end portion which in the unstressed condition of the deformable member is disposed in a plane offset from and parallel to the plane of the disc portion.

References Cited in the file of this patent

UNITED STATES PATENTS

| 1,150,148 | Putnam | Aug. 17, 1915 |
| 1,403,270 | Small | Jan. 10, 1922 |
| 2,140,606 | Stickles | Dec. 20, 1938 |
| 2,241,923 | Ridgway | May 13, 1941 |
| 2,264,466 | Weisel | Dec. 2, 1941 |

FOREIGN PATENTS

| 23,033 | Great Britain | Sept. 29, 1908 |
| 23,817 | Great Britain | Nov. 6, 1908 |